July 7, 1931.  E. J. KVET  1,812,963
CHANNELED STRIP MATERIAL
Filed May 3, 1929
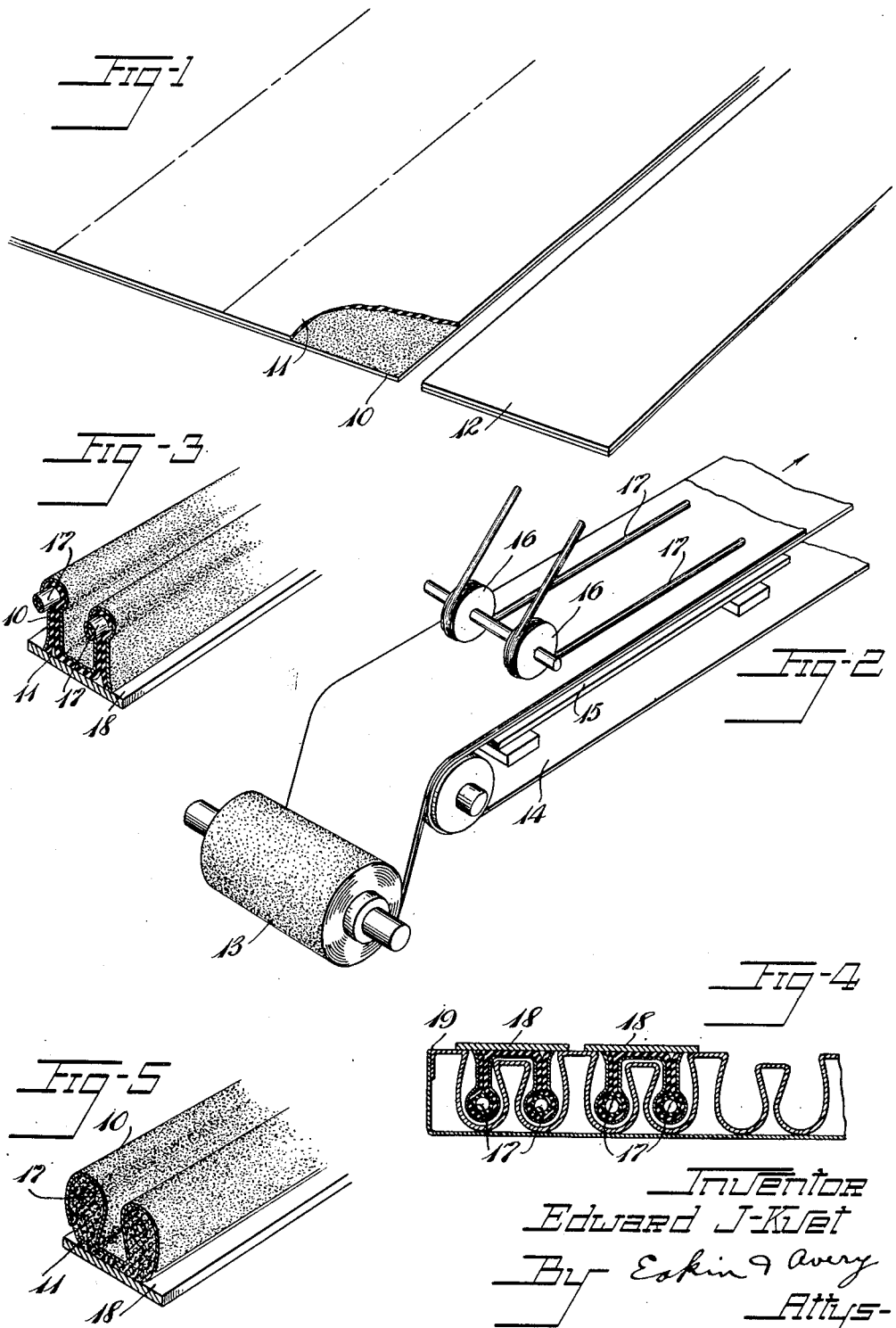
Inventor
Edward J. Kvet
By Eakin & Avery
Attys Patented July 7, 1931

1,812,963

UNITED STATES PATENT OFFICE

EDWARD J. KVET, OF AKRON, OHIO, ASSIGNOR TO THE B. F. GOODRICH COMPANY, OF NEW YORK, N. Y., A CORPORATION OF NEW YORK

CHANNELED STRIP MATERIAL

Application filed May 3, 1929. Serial No. 360,096.

This invention relates to channeled strip material such as is used to guide and cushion the margins of window panes in automobiles, for example, and its chief objects are conveniently to provide a channeled strip having desirable cushioning properties, to provide conveniently a channeled strip having desirably thick side-wall margins having a wide range of resilience to permit them to grip glasses of different thicknesses without too great a variation in their gripping force and to provide some or all of these advantages in a channeled strip comprising sponge rubber.

Of the accompanying drawings:

Fig. 1 is a perspective view of a rubberized sheet of fibrous material illustrating certain steps in the practice of my invention in its preferred form.

Fig. 2 is a perspective view illustrating a subsequent step.

Fig. 3 is a perspective view of the work at a later stage.

Fig. 4 is a vertical section of vulcanizing apparatus with the work therein.

Fig. 5 is a perspective view of the finished strip.

Referring to the drawings, 10 is a sheet of fibrous material such as felt or woven fabric, upon which is calendered a layer of rubber composition 11, preferably a sponge-rubber composition. After calendering of the sheet it is cut into strips such as the strip 12, which for convenient storage and handling may be wound in a roll 13, Fig. 2.

By means of a belt conveyor 14, a supporting table 15 for the upper reach of the same and a pair of guiding and pressing rolls 16, 16, or in any other suitable manner, a rubber tube 17, preferably semi-cured and cemented for adhesion, is pressed onto each margin of the rubber composition layer 11 of the strip, and the strip is then folded to the form in which it is shown in Fig. 3 and is stuck to a base-strip 18, preferably of rubberized fibrous material, as there shown, to provide a composite strip of channeled form with the tubes 17 serving as cores giving relatively great thickness to the marginal portions of the side-walls of the channel strip.

A number of such strips are then vulcanized in a molding device or pan such as the pan shown at 19 in Fig. 4, preferably in moist air, the sponge-rubber composition swelling during the cure, to produce the finished product shown in Fig. 5, in which the rubber tubes 17 give the side walls of the channel desirable thickness and a wide range of deformability, for use with glasses of different thicknesses, and desirably high cushioning properties, although the layer of sponge-rubber composition is initially of uniform thickness.

I claim:

1. Channeled strip material comprising rubber sidewalls, a fibrous cover for said sidewalls adhesively attached thereto, and a rubber tube enclosed in the margin of each sidewall of the strip and vulcanized thereto.

2. Channeled strip material comprising sponge-rubber sidewalls and a tube of dense rubber enclosed in each of the walls.

3. Channeled strip material comprising rubber-faced fabric folded to channel form and filler members in the legs of the channel, the rubber-faced fabric of the legs extending about the filler members respectively with the rubber-facing inside of the fabric and surrounding the filler members, the fabric, rubber-facing and filler members being vulcanized together as a unitary structure.

In witness whereof I have hereunto set my hand this 26th day of April, 1929.

EDWARD J. KVET.